Figure 1:
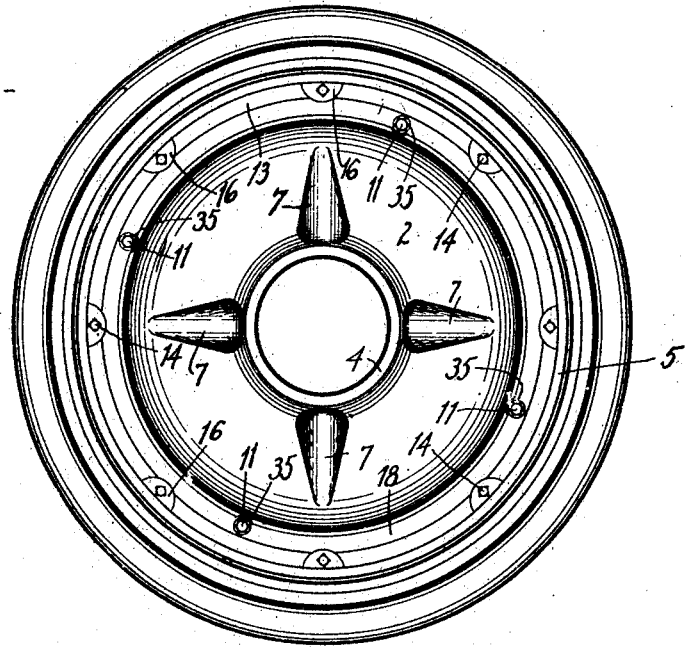

K. KNUDSEN.
WHEEL.
APPLICATION FILED JULY 29, 1919.

1,366,083.

Patented Jan. 18, 1921.
2 SHEETS—SHEET 1.

INVENTOR.
Karsten Knudsen,
BY
Frank A. Cutter,
ATTORNEYS.

K. KNUDSEN.
WHEEL.
APPLICATION FILED JULY 29, 1919.

1,366,083.

Patented Jan. 18, 1921.
2 SHEETS—SHEET 2.

INVENTOR.
Karsten Knudsen,
BY Frank A. Cutter,
ATTORNEYS.

UNITED STATES PATENT OFFICE.

KARSTEN KNUDSEN, OF GRAND RAPIDS, MICHIGAN, ASSIGNOR TO ELECTRIC WHEEL CO., ASSOCIATES, OF SPRINGFIELD, MASSACHUSETTS.

WHEEL.

1,366,083.  Specification of Letters Patent.  Patented Jan. 18, 1921.

Application filed July 29, 1919. Serial No. 314,081.

*To all whom it may concern:*

Be it known that I, KARSTEN KNUDSEN, a citizen of the United States of America, and a resident of Grand Rapids, in the county of Kent and State of Michigan, have invented a new and useful Wheel, of which the following is a specification.

My invention relates to improvements in wheels in which the motive power is within, such as the electric-motor wheels for transportation and other vehicles of a more or less similar character, and also in wheels in which the reduction-gear device or mechanism is contained, the motive power being outside, said invention in some measure relating to the wheel covered by United States Letters Patent, No. 1,075,655.

The aforesaid improvements reside in certain peculiar features of wheel-casing construction, including new and novel cover-plate-holding means and tire-holding means, all as hereinafter set forth.

It has heretofore been the practice, in the construction of wheels of the aforesaid type, to force the outer disk or cover into place with a tight fit inside of the band, and to press the tire on to such band. The reasons for the tight fit of the cover and that of the tire are well known to those skilled in the art. Obviously there are serious drawbacks and objections to a construction of this kind, such as the need for great accuracy in workmanship, and the time, labor, and skill involved in taking the wheel apart and putting it together again, when repairs have to be made. The primary object of my invention is, therefore, to remove the aforesaid drawbacks and objections. The cover is easily removable in the present wheel construction, so also is the tire, it being possible to remove, and replace as well, either or both said cover and tire with no other tool than an ordinary wrench.

Another object is, by avoiding the use of bolts which pass through the interior of the wheel, as I am able to do, to economize space within said wheel for the mechanism therein, and even to reduce the outside rim diameter if desired.

Still another object, which also depends upon the absence of bolts that pass through the wheel interior, is the avoidance of leakage through the front and back sides of the wheel, something to which the old construction is subject.

The wheel rim and back disk or plate in this case are integral, which is an advantage over a construction in which such members are separate and independent and bolted or otherwise mechanically joined together. This combined rim and back plate form what may be termed a housing.

Still another object is to produce a wheel which is strong, tight, durable, and withal practicable and efficient.

Other objects and advantages will appear in the course of the following description.

A preferred embodiment of the invention, whereby I attain the objects and secure the advantages of the same, is illustrated in the accompanying drawings, and I will proceed to describe said invention with reference to said drawings, although it is to be understood that the form, construction, arrangement, etc. of the parts in various aspects are not material and may be modified without departing from the spirit of the invention.

Figure 2:
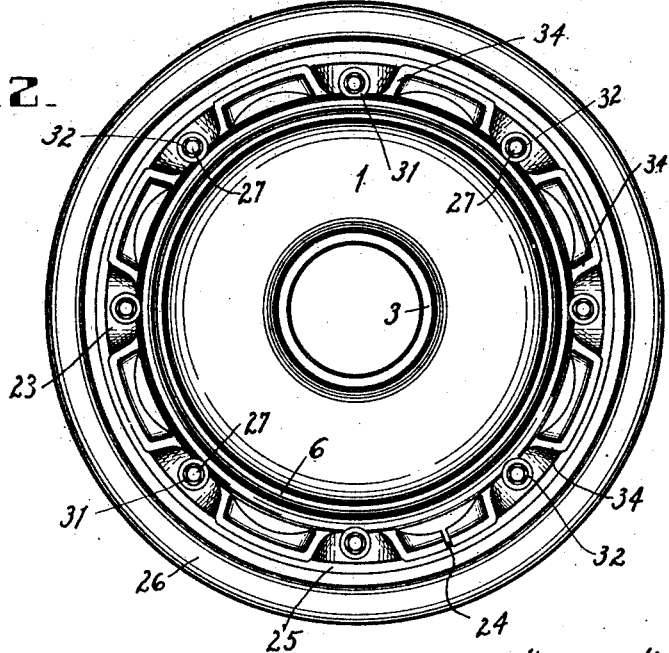
Figures 3, 4, 5, 6, 7:
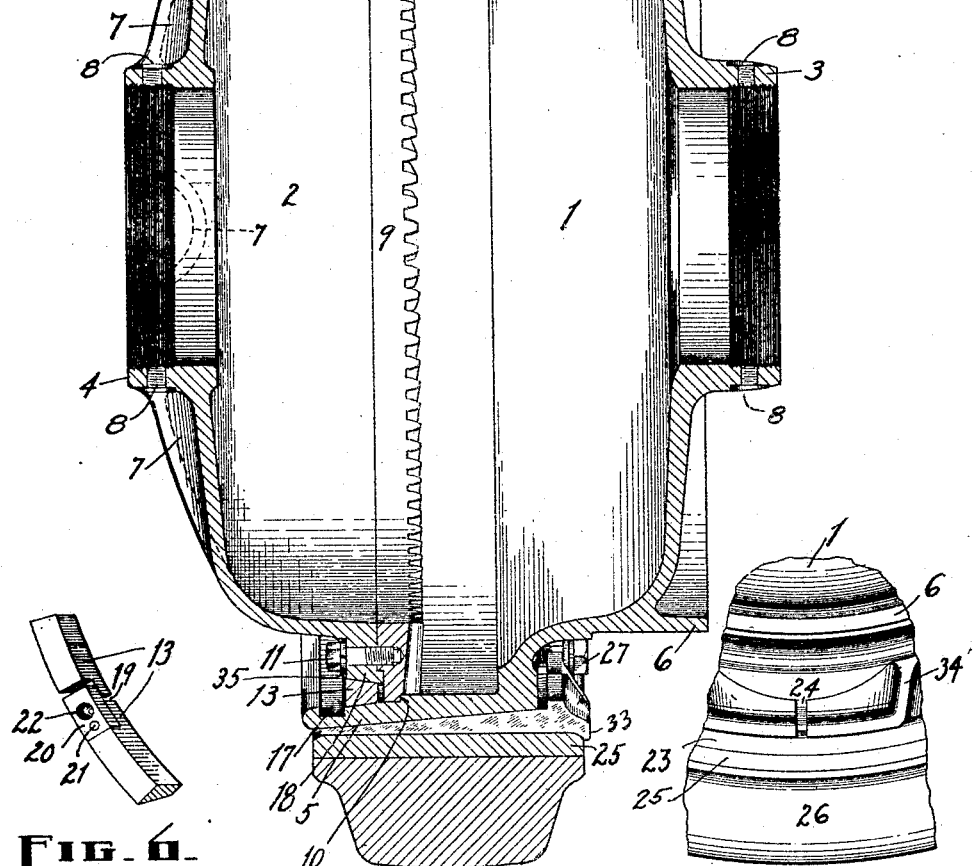

In the drawings, in which like characters of reference designate like parts throughout the several views, Figure 1 is a front elevation of a wheel which embodies my invention as aforesaid; Fig. 2, a rear elevation of the same; Fig. 3, an enlarged, central, transverse section through said wheel; Fig. 4, an enlarged, fragmentary, front elevation showing one of the clamps with its bolt and a portion of the lock- or clamp-ring by means of which the cover is held to the housing; Fig. 5, a similar, rear elevation showing a portion of the flange of the expansion ring by means of which the rubber tire or its band is secured in position; Fig. 6, a fragmentary, isometric view of said clamping-ring, showing the lap joint therein, and, Fig. 7, an enlarged, fragmentary, rear elevation showing the split in said expansion ring.

Referring to the drawings it will be seen that my wheel comprises a housing 1 and a cover 2, said housing and cover having open, reinforced centers or hubs 3 and 4, respectively, where are located the bearings (not shown) upon which the wheel revolves. The housing has a forwardly-extending rim 5 and a rearwardly-extending brake-drum flange 6. The cover 2 has a plurality of external, radial channels 7 in the face thereof, which form interior stiffening ribs for said cover. Openings 8 are tapped in the hub 3 to receive oil-cups (not shown), and in the hub 4 and arranged to open outwardly into the channels 7 to receive lock-screws for a bearing-adjustment nut (not shown).

A bevel-gear ring 9 is shouldered at 10 to the inner edge of the cover 2 and fastened to the same by bolts 11. The external diameter of the gear ring 9 is larger than the major diameter of the cover 2, and said ring has a loose fit circumferentially in the housing, or in the rim 5 of such housing, against a shoulder 12 in said rim. Obviously the inner edge portion of the cover 2 as well as the gear ring 9 are received within the rim 5.

Adjacent surfaces of the housing rim 5 and the inner edge portion of the cover 2 are tapered in opposite directions to provide an outwardly-flaring annular channel in which is received a lock ring 13, which latter is tapered to correspond to its contiguous parts or surfaces. The lock-ring 13 is forced tightly into the aforesaid channel and there secured by means of a plurality of bolts 14. The inner end of each bolt 14 is received in a recess 15 in the outer face of the lock-ring 13, after passing through a clamp 16 into and through which the body of said bolt is tapped. Each clamp 16 is received in an annular channel or groove 17 in the inner periphery of the housing rim 5 near the forward edge of such rim, and held in such groove by the force of the bolt which engages said clamp, exerted on the lock-ring 13, which latter in turn is wedged between the rim 5 and the cover, and at the same time crowds the gear ring 9 against the shoulder 12.

That portion of the cover through which the bolts 11 pass and against which the lock-ring 13 is wedged by the means and in the manner just described may be designated by the numeral 18.

The threaded parts of the clamping device just described are wedged into each other by the thrust exerted on the inner ends of the bolts 14 and imparted to the clamps 16 in the groove 17, and so form a good locking element for the cover 2 and gear ring 9. The parts and members of this clamping or locking device are, of course, made of such material and so proportioned as to size, that said device is capable of safely withstanding any strain or force that in practice may be applied thereto.

In order that the lock-ring 13 shall bear equally with both tapered surfaces, said ring is split so that its ends can separate, as at 19 in Fig. 6, to a sufficient extent to render compensation possible for what little difference there may be in the machining of the ring and of the tapered surfaces of the contiguous members. A rabbeted joint may be made at the lock-ring opening 19, by inserting or insetting a piece or plate 20 and riveting it at 21 to the ring at one side of said opening. The plate 20 has a recess 22 therein to receive the inner terminal of one of the bolts 14, such recess corresponding with the recesses 15 in the lock-ring itself.

The best manner of placing the split-ring 13 in place and seating it is described as follows: The clamps 16 are first put loosely in place with their outer edges in the groove 17, and then the bolt 14 which is diametrically opposite to the opening 19 is tightened, after which the other bolts 14 are tightened alternately from the starting point ending with the bolt which engages the plate 20. By alternately is meant first the bolt on one side of the vertical plane in which are located the axis of the wheel and the bolt first tightened, then the bolt on the other side of such plane, and so on. As the final act in the tightening operation the bolts 14 are gone over again successively and tighteded still more.

To gain access to the interior of the wheel, it is necessary merely to loosen the bolts 14, remove the clamps 16, tap the outside edge of the housing 1 or of the housing rim 5, with a mallet or other suitable implement, to loosen the lock-ring 13, and take out said ring, when the cover 2 can be withdrawn readily, since the bevel-gear ring 9 has a loose fit at 12 with the housing rim 5.

The periphery of the housing rim 5 is tapered from the forward edge rearwardly and inwardly and mounted on said rim is a band 23 internally tapered and of a size to fit said periphery. The band 23 is split, as at 24, to permit said band to expand against the inside of a steel base band 25 to which a rubber tire 26 is vulcanized. The expansion is accomplished by means of a series of bolts 27. Each bolt 27 is received in an opening 28 tapped into the back edge or side of the housing rim 5, after passing through a slot 29 in an inturned, integral flange 30 at the back of the band 23. A plain washer 31 and a lock-washer 32 respectively are interposed between the flange 30 and each of the heads of the bolts 27. The slots 29 accommodate the flange 30 to the bolts 27, such accommodation being needed on account of the expansion of the band 23 permitted by the presence of the opening 24 in said band, which opening extends through said flange. At the back edge of the band 23, or the back side of the flange 30, is a series of outwardly-extending lips 33 which contact with the rear edge of the band 25, and said flange may be provided on said back side with a plurality of oblique, reinforcing or stiffening ribs 34.

The construction, arrangement, and proportion of the parts are such that the tire band 25 can be slipped onto the expanding band 23 by hand, before the bolts 27 are tightened. After thus placing the band 25 with the tire 26 the same is secured by tightening the bolts 27 and so expanding the band 23. Upon loosening the bolts 27 the tire band can be easily removed by hand. The band 23 is placed on the housing rim 5 from the rear, and the band 25, to which is vulcanized the tire 26, is placed on and removed from said band 23 from the front, as will readily be seen.

The construction of the flange 30 and the arrangement of the ribs 34 are such that the heads of the bolts 27 are out of the way in the recesses provided in part by said ribs, and there is room for the application to such heads of a wrench and for the operation of the latter.

While it might be possible to make either the lock-ring 13 or the expansible band 23, or both, in sections, it is believed that one-piece, split members are far more practicable and less expensive.

Each bolt 11 is provided with a lock-washer 35.

What I claim as my invention, and desire to secure by Letters Patent, is:—

1. In a wheel, of the class described, a housing comprising integral back-plate and rim members, a cover, and detachable means to secure said cover to said housing.

2. In a wheel, of the class described, a housing, a cover, a lock-ring receivable between interior and exterior, respectively, peripheral parts of said housing and cover, and detachable means to secure said ring in place.

3. In a wheel, of the class described, a housing having a shouldered part, a gear ring in said housing in engagement with said shouldered part, a cover having a part to engage said ring, and detachable means to secure said cover to said housing.

4. In a wheel, of the class described, a housing having a shouldered part, a gear ring in said housing in engagement with said shouldered part, a cover having a part to engage said ring, a lock-ring receivable between interior and exterior, respectively, parts of said housing and cover, and detachable means to secure said rings in place.

5. In a wheel, of the class described, a housing, a cover, a split lock-ring receivable between interior and exterior, respectively, parts of said housing and cover, and detachable means to secure said ring in place.

6. In a wheel, of the class described, a housing, a cover, a split lock-ring receivable between interior and exterior, respectively, parts of said housing and cover, said ring being provided with a rabbeted joint, and detachable means to secure said ring in place.

7. In a wheel, of the class described, a housing consisting in part of a recessed rim, a cover, a lock-ring receivable between said rim and said cover, clamps adapted to engage the recessed parts of said rim, and means supported by said clamps and arranged to bear forcibly against said ring, to secure the latter in place.

8. In a wheel, of the class described, a housing consisting in part of a recessed rim, a cover, a recessed lock-ring receivable between said rim and said cover, clamps adapted to engage the recessed parts of said rim, and bolts tapped into said clamps and at their inner ends adapted to engage the recessed parts of said ring.

9. In a wheel, of the class described, a housing consisting in part of a shouldered and recessed rim, a gear ring in said housing in engagement with the shouldered part of said rim, a cover having a part to engage said ring, a recessed lock-ring receivable between said rim and said cover, clamps adapted to engage the recessed parts of said rim, and bolts tapped into said clamps and at their inner ends adapted to engage the recessed parts of said lock-ring.

10. In a wheel, of the class described, a housing consisting in part of a rim, a cover, a lock-ring receivable between interior and exterior, respectively, parts of said rim and cover, and detachable securing means for said ring, such means being interposed between said rim and ring.

KARSTEN KNUDSEN.

Witnesses:
AGNES KNUDSEN,
J. RAYMOND PLANK.